United States Patent [19]

Ma

[11] Patent Number: 5,132,876
[45] Date of Patent: Jul. 21, 1992

[54] BUILT-UP NOTEBOOK COMPUTER

[76] Inventor: Hsi K. Ma, 4F., No. 48, Sec. 2, Chung Cherng Rd., Taipei, Taiwan

[21] Appl. No.: 769,238

[22] Filed: Oct. 1, 1991

[51] Int. Cl.$^5$ .......................... H05K 5/02; H05K 7/14; G06F 1/00
[52] U.S. Cl. .................................... 361/394; 361/380
[58] Field of Search ................. 364/708; 361/380, 390, 361/391, 392, 393, 394, 395, 399

[56] References Cited

U.S. PATENT DOCUMENTS

| | | | |
|---|---|---|---|
| 4,333,155 | 6/1982 | Johnston | 364/708 |
| 4,479,198 | 10/1984 | Romano et al. | 364/708 X |
| 4,680,674 | 7/1987 | Moore | 364/708 X |
| 4,689,761 | 8/1987 | Yurchenco | 364/708 |
| 4,926,365 | 5/1990 | Hsieh | 364/708 |

*Primary Examiner*—Leo P. Picard
*Assistant Examiner*—Michael W. Phillips
*Attorney, Agent, or Firm*—Bacon & Thomas

[57] ABSTRACT

A built-up notebook computer comprised of a unitary upper cover and keyboard unit, a motherboard, a floppy disk drive, a hard disk drive, a rechargeable battery, a power supply unit, a modem and a flat display, wherein the flat display is pivoted to the upper cover and keyboard unit through plug-in joint; the power supply unit and the modem are set in two chambers on the upper cover and keyboard unit; the motherboard, the floppy disk drive, the rechargeable battery and the hard disk drive are respective connected to the upper cover and keyboard unit at the bottom by hook joint and electrically interconnected; the motherboard, the floppy disk drive, the hard disk drive, the power supply unit and the modem are firmly secured together by two screws.

1 Claim, 2 Drawing Sheets

BUILT-UP NOTEBOOK COMPUTER

BACKGROUND AND SUMMARY OF THE INVENTION

Computers have been well developed and have become popular in every field. The popularity of computerization has been commonly deemed as one of the indices in measuring the social development of a country. Recently, various types of portable personal computers have been disclosed to greatly reduce space occupation. However, regular portable personal computers are generally made in a compact, unitary unit which needs much labor effort to assemble. Further, if any part of a portable personal computer is damaged, the whole unit of the portable personal computer may become inoperative or useless.

The present invention has been accomplished under the circumstances in view. It is therefore the main object of the present invention to provide a built-up notebook computer which can be conveniently set up and parts of which can be conveniently detached for replacement.

DETAILED DESCRIPTION OF THE PREFERRED EMBODIMENT

Figure 1:
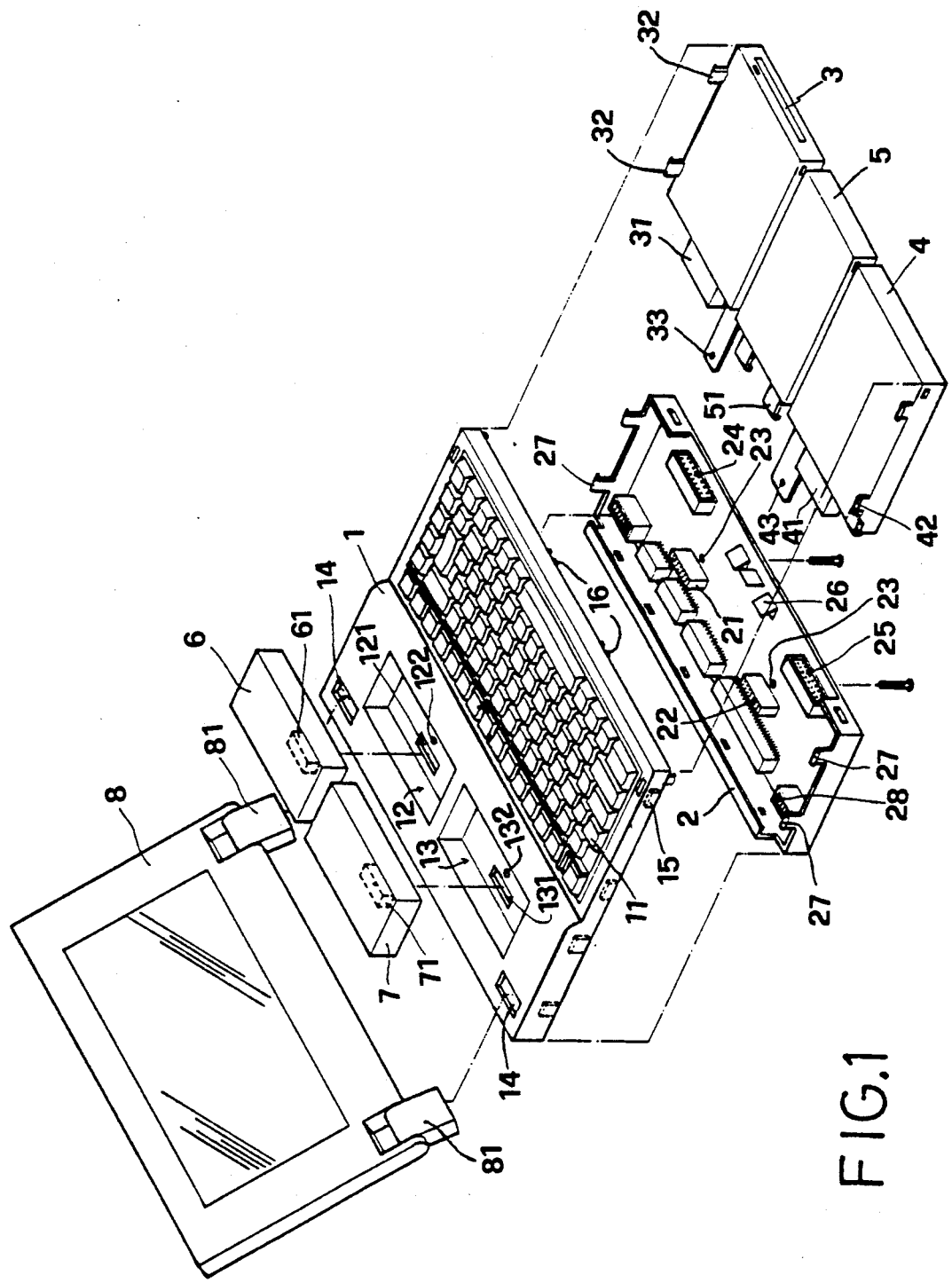
FIG. 1 is an exploded perspective view of the preferred embodiment of the present invention.
Figure 2:
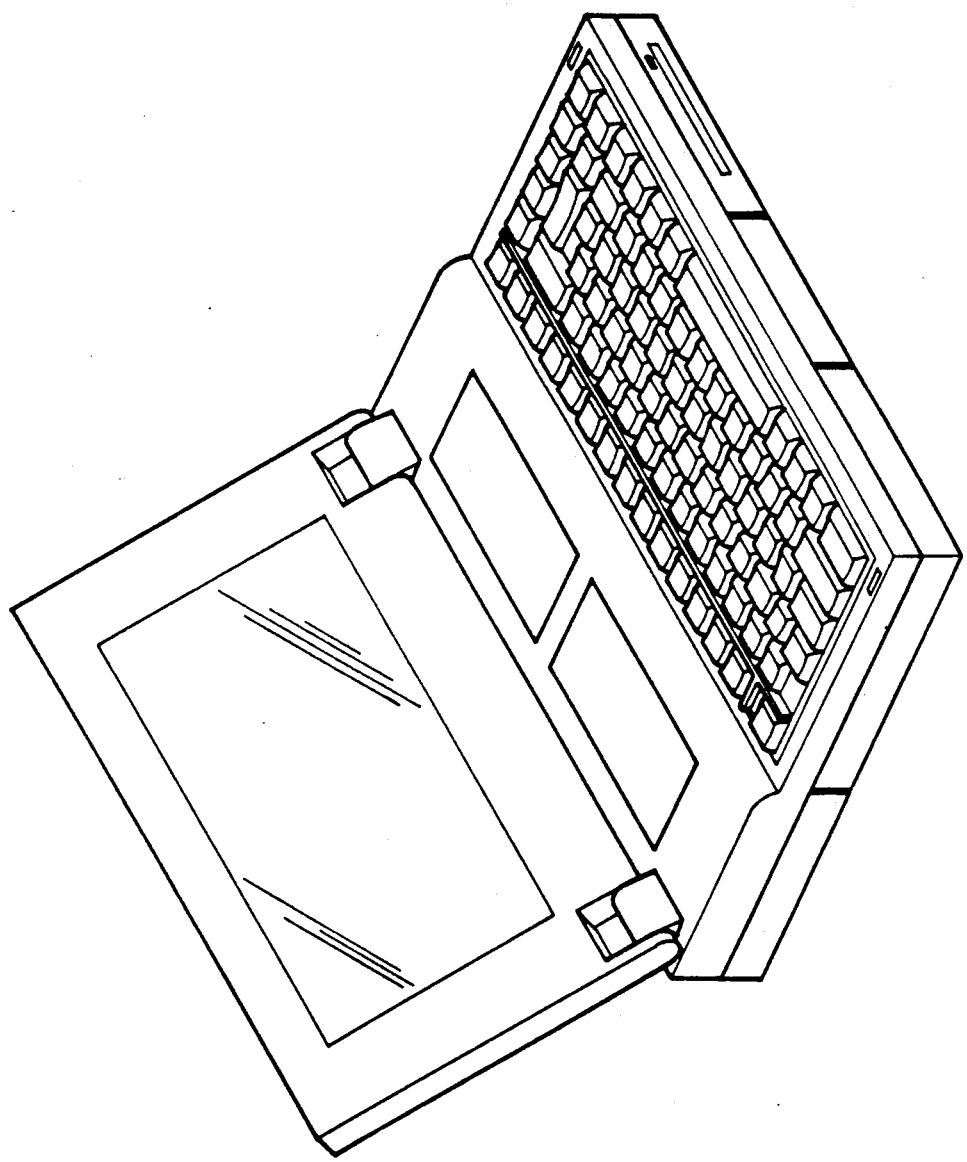
FIG. 2 is a perspective assembly view thereof.

Referring to the annexed drawings in detail, therein illustrated is the preferred embodiment of the built-up notebook computer of the present invention which is generally comprised of a keyboard and upper cover unit 1, a motherboard 2, a floppy disk drive 3, a hard disk drive 4, a rechargeable battery 5, a power supply unit 6, a modem 7, and a flat display 8.

The keyboard and upper cover unit 1 is a unitary unit having switch keys 11 on the top at the front, two chambers on the top behind said switch keys 11, namely, a first chamber 12 for power supply unit and a second chamber 13 for modem, which two chambers each has a connector hole 121 or 131 at the center and a fastening hole 122 or 132, two mounting holes 14 on the top at two opposite corners behind said chambers 12, 13 for mounting the flat display 8, a plurality of retaining slots 15 on the bottom at two opposite ends for the connection thereto of the floppy disk drive 3, and the hard disk drive 4, and a rechargeable battery 5 secured to disk drives 3 and 4, and a plurality of hooks 16 on the bottom at the front for holding the floppy disk drive 3, the hard disk drive 4 in place, and the rechargeable battery 5 therebetween.

The motherboard 2 is a board equipped with requisite circuits and transistors, having a power connector 21 and a modem connector 22 corresponding to the connector holes 121, 131 on the chambers 12, 13 of the upper cover and keyboard unit 1 for connecting the power supply unit 6 and the modem 7 electrically, two fastening holes 23 corresponding to the fastening holes 122, 132 on the chambers 12, 13 of the upper cover and keyboard unit 1 for fastening the power supply unit 6 and the modem 7 in place, a floppy disk drive connector 24 and a hard disk drive connector 25 and a rechargeable battery connector 26 for connecting the floppy disk drive 3 and the hard disk drive 5 and the rechargeable battery 5 electrically respectively, a plurality of hooks 27 corresponding to some of the retaining slots 15 for connecting to the upper cover and keyboard unit 1, and two flat display connectors 28 on the top at two opposite corners for connecting the flat display 8 electrically.

The floppy disk drive 3 is comprised of a casing having a connector 31 for connecting the floppy disk drive connector 24 on the motherboard 2 electrically, a plurality of hooks 32 at one side for hooking in the corresponding retaining slots 15 on the upper cover and keyboard unit 1, and a connecting plate 33 which has a hole corresponding to the fastening hole 122 on the first chamber 12 of the upper cover and keyboard unit 1 for connection.

The hard disk drive 4 is similar to the floppy disk drive 3 in outer appearance, having a connector 41 for connecting the hard disk drive connector 25 on the motherboard 2 electrically, a plurality of hooks 42 at one side for hook in the corresponding retaining slots 15 on the upper cover and keyboard unit 1, and a connecting plate 43 which has a hole corresponding to the fastening hole 132 on the second chamber 13 of the upper cover and keyboard unit 1 for connection.

The rechargeable battery 5 is comprised of a casing having a connector 51 for connecting the rechargeable battery connector 26 on the motherboard 2 electrically and simultaneously for securing to the motherboard 2 in place.

The power supply unit is comprised of a casing having a connector 61 at the bottom for inserting through the connector hole 121 on the first chamber 12 of the upper cover and keyboard unit 1 to connect to the power connector 21 on the motherboard 1 electrically.

The modem 7 is comprised of a casing having a connector 71 at the bottom for inserting through the connector hole 131 on the second chamber 13 of the upper cover and keyboard unit 1 to connect to the modem connector 22 on the motherboard 1 electrically.

The flat display 8 is of the known art, having two connectors 81 pivoted thereto at two opposite ends for inserting through the mounting holes 14 to connect to the flat display connectors 28 on the motherboard 2 electrically.

According to the foregoing statement, the aforesaid parts can be conveniently connected with one another into a notebook computer. During assembly process, the upper cover and keyboard unit 1 is regarded as a base for the connection thereto of the other parts. The motherboard 2, the floppy disk drive 3, the hard disk drive 4 and the rechargeable battery 5 are respectively attached to the upper cover and keyboard unit 1 at the bottom, and the power supply unit 6 and the modem 7 are respectively fastened into the two chambers 12, 13 on the upper cover and keyboard unit 1. Once the respective connectors are electrically connected, fasten two screws through the fastening holes 23 on the motherboard 2 from the bottom into the holes on the connecting pleas 33, 42 to simultaneously secure the power supply unit 6 and the modem 7 thereto (the power supply unit and the modem each has a bolt hole corresponding to the fastening hole 122 or 132 for fastening). Then, the two connectors 81 of the flat display 8 are respectively inserted through the mounting holes 14 and connected to the two flat display connectors 28 on the motherboard 2.

As indicated, the present invention can be conveniently set up and only two screws are required for fastening the parts in place. Either part can be conveniently detached from the whole assembly for replacement or repair. However, it is to be understood that the drawings are designed for purposes of illustration only, and are not intended as a definition of the limits and scope of the invention disclosed.

What is claimed is:

1. A built-up notebook computer, comprising:

a keyboard and upper cover unit being a unitary unit having switch keys on the top edge thereof at the front, a first chamber and a second chamber on the top behind said switch keys, said first and second chambers each having a connector hole and a fastening hole, two mounting holes on the top edge thereof at two opposite corners behind said chambers, a plurality of retaining slots on the bottom edge thereof at two opposite ends, and a plurality of hooks on the bottom edge thereof at the front;

a motherboard attached to said upper cover and keyboard unit at the bottom and retained by the hooks thereof, said motherboard having a power connector and a modem connector corresponding to the connector holes on said two chambers of said upper cover and keyboard unit, two fastening holes corresponding to the fastening holes on said two chambers of said upper cover and keyboard unit, a floppy disk drive connector and a hard disk drive connector and a rechargeable battery connector on the top edge thereof at the front, a plurality of hooks hooked in the corresponding retaining slots on said upper cover and keyboard unit, and two flat display connectors on the top edge thereof at two opposite corners corresponding to said two mounting holes on said upper cover and keyboard unit;

a floppy disk drive having a connector connected to said floppy disk drive connector on said motherboard electrically, a plurality of hooks at one side hooked in the corresponding retaining slots on said upper cover and keyboard unit, and a connecting plate with a hole thereon secured to the fastening hole on said first chamber of said upper cover and keyboard unit by a first screw;

a hard disk drive having a connector connected to said hard disk drive connector on said motherboard electrically, a plurality of hooks at one side hooked in the corresponding retaining slots on said upper cover and keyboard unit, and a connecting plate with a hole thereon secured to the fastening hole on said second chamber on said upper cover and keyboard unit by a second screw;

a rechargeable battery having a connector connected to said rechargeable battery connector on said motherboard electrically;

a power supply unit set in said first chamber of said upper cover and keyboard unit and secured in place by said first screw, said power supply unit having a connector at the bottom inserted through the connector hole on said first chamber of said upper cover and keyboard unit and connected to said power connector on said motherboard electrically;

a modem set in said second chamber of said upper cover and keyboard unit and secured in place by said second screw, said modem having a connector at the bottom inserted through the connector hole on said second chamber of said upper cover and keyboard unit and connected to said modem connector on said motherboard electrically; and a flat display pivoted to said upper cover and keyboard unit at the top, said flat display having two connectors pivoted thereto at two opposite ends and inserted through said mounting holes and electrically connected to said flat display connectors on said motherboard.

* * * * *